July 13, 1937.  H. L. SANDERSON  2,087,167
TELLTALE AUTOMOBILE LICENSE PLATE
Filed Dec. 22, 1936  2 Sheets-Sheet 1
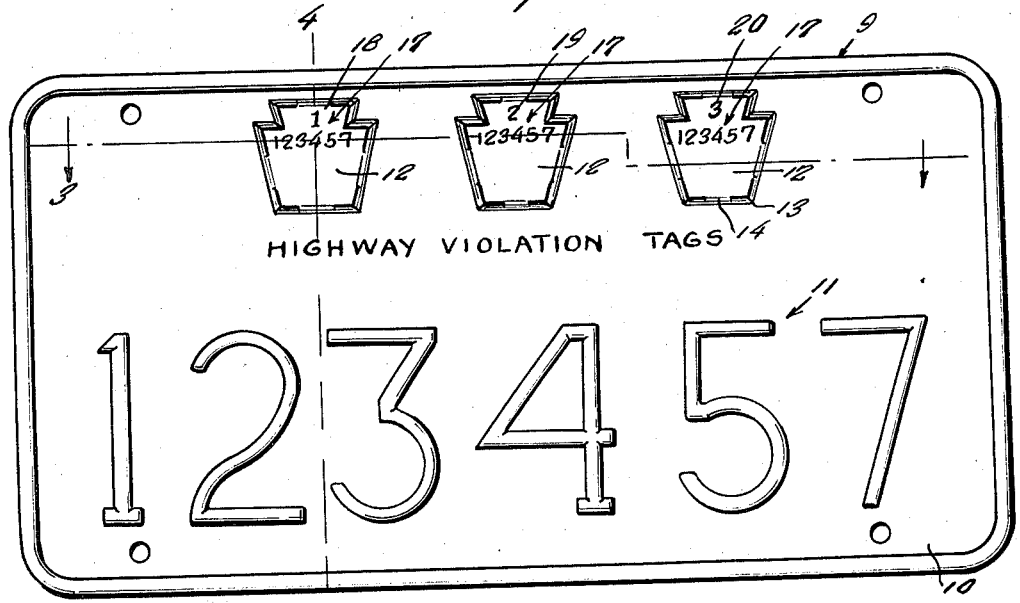
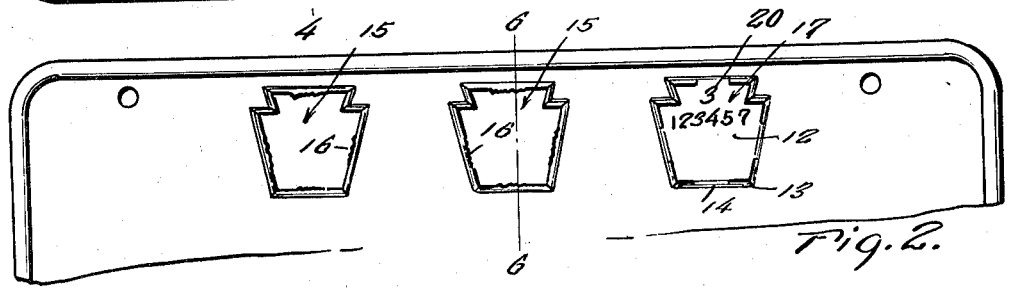
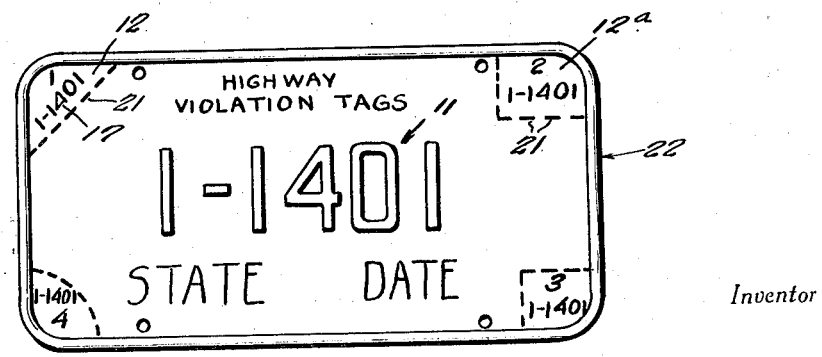
Inventor
H. L. Sanderson
By Clarence A. O'Brien
Hyman Berman
Attorneys

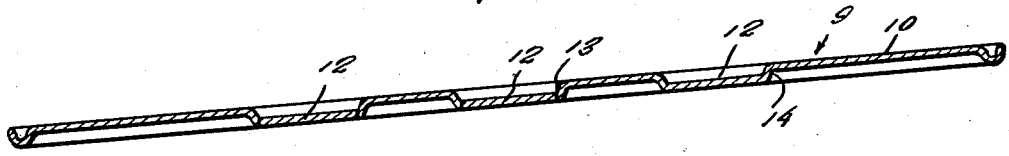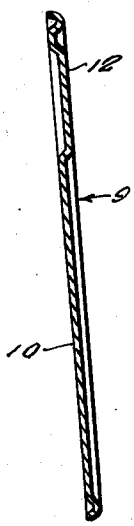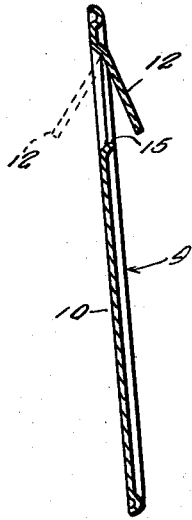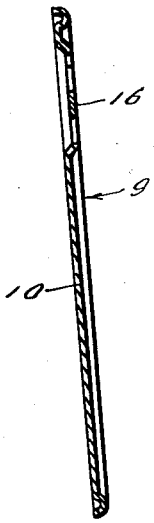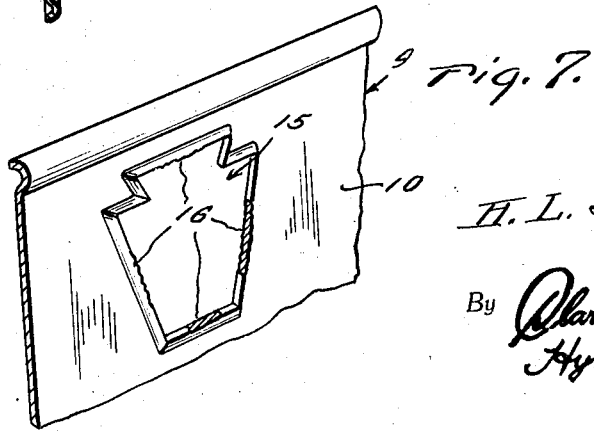

Patented July 13, 1937

2,087,167

UNITED STATES PATENT OFFICE 2,087,167

TELLTALE AUTOMOBILE LICENSE PLATE

Harvey L. Sanderson, Butler, Pa.

Application December 22, 1936, Serial No. 117,187

3 Claims. (Cl. 40—125)

This invention relates to so-called automobile license tags and plates of the type attachable to motor vehicles and similar conveyances for the purpose of identifying and differentiating automobiles, and it has reference to what may be called a conventional or regulation type license plate characterized by specially marked and isolated sectors of a disruptable and removable nature useful in enabling the authorities to readily classify drivers to distinguish the cautious and careful drivers from the heedless and careless ones.

Statistical annual records reveal beyond any question of doubt the need of ways and means susceptible of promoting safe and sane automobile driving. The wreckful nature of the admittedly reckless driver stamps him as a menace to society. Disasters and repeated avoidable accidents have inspired me, as a resentment against the reckless driver, to provide some visible means whereby the public and the authorities may, at a glance, segregate the headstrong, heedless driver from the cautiously careful group.

Motivated by the desire to systematically classify drivers in a reasonably practicable manner, I have found it expedient and practicable to accomplish this in my own small way by so fabricating and fashioning the regulation license plate that visible means is incorporated therein to function as a reliable tell-tale way of subjecting this class of undesirables to certain psychological embarrassments and due penalties resulting in loss of permit and the right to drive in predetermined localities.

As before intimated, in reducing the principles of my inventive conception to practice, I provide the license plate with perforated sectors susceptible of being punched out by appropriate authorities, whereby to show, in a proportionate manner, when traffic violation and accident has overtaken the owner of the mutilated tag carried by the violator.

Other features and advantages will become more readily apparent from the following description and drawings.

In the drawings:

Figure 1 is an elevational view of the preferred embodiment of the license plate as constructed in accordance with my inventive ideas.

Figure 2 is a fragmentary view showing the deliberately mutilated indicator sectors of the partially stamped plate.

Figure 3 is a horizontal section on the plane of the line 3—3 of Figure 1.

Figure 4 is a section on the line 4—4 of Figure 1.

Figure 5 is a view like Figure 4 showing the disruptable sector or tell-tale indicator in the process of being pried or struck out.

Figure 6 is a section taken approximately on the plane of the line 6—6 of Figure 2.

Figure 7 is a fragmentary perspective view exaggerating the nature of the invention.

Figure 8 is a modification of the basic idea illustrated in Figure 1.

Referring now to the drawings by distinguishing reference numerals, it will be observed that the complete so-called conventional or regulation license plate or tag is denoted by the numeral 9. This comprises a marginal beaded plate 10 of customary design provided with embossed or pressed numerals defining the license number assigned the holder by the State or other authority. In accordance with the present invention, the plate is also provided with distinguishable areas or sectors denoted by the numerals 12. In the present arrangement I have selected three such tell-tale sectors, and these are of a predetermined outline, being here shown as keystone representation. It would be the idea to utilize, possibly, different outlines or insignia of the various States to facilitate identification of reckless drivers. The outline of the pressed-out, tell-tale indicator 12 is virtually defined by spaced score lines or perforations 13 and intervening connective webs 14. Thus, with the use of an appropriate tool or instrument, the entire marginally bound sector 12 can be forced out, as shown, for example, in Figures 2 and 7. This leaves an identification opening 15 and remnants of the removed elements 12 forming ragged remains 16. When thus struck out, the tell-tale indicator 12 mutilates the tag and is indicative of an accident resulting from reckless driving, imposed on the holder or owner of the car bearing said mutilated license plate.

In practice I have found it expedient and practicable to supply each removable or disruptable, tell-tale sector 12 with a serial or registration number, as indicated at 17. Then, too, the various sectors 12 may be consecutively numbered, as indicated at 18, 19, and 20, in Figure 1. It follows, therefore, that the degree of mutilation of the tag enables the authorities to determine at a glance the general classified character of the driver of the car carrying such tag or license plate. Naturally, the careful driver, not having accidents over a complete fiscal year, would have an unmutilated or complete license plate, and consequently, the invention serves as an aid to the authorities as well as the general public in spotting culprits, so to speak.

The same fundamental idea is depicted in Figure 8, wherein, instead of using especially shaped sectors 12, the corresponding sectors 12a are defined by score lines 21, these being punched out from a flat tag or plate 22 in the same manner and for the same purposes.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. An automobile license plate having a plurality of disruptable sectors offset from the plane of the surface of the plate, said sectors having perforations at their marginal edges outwardly from the plane of the plate to facilitate removal thereof.

2. In an automobile license plate, a plurality of removable sectors, each defined by a continuous outwardly slanting wall defining the contour of the sector, and each sector having weakened portions contiguous to the inner edge of the slanting wall which is immediately adjacent the sector to facilitate removal of the sector from the plate.

3. As a new article of manufacture, an automobile license plate provided with a plurality of disruptable sectors, each sector being of a predetermined configuration offset from the plane of the surface of the plate and connected thereto along their marginal edges by outwardly projecting walls, the edges of said walls immediately adjacent said disruptable sectors having perforations to receive a tool to facilitate removal of said sectors from the plate.

HARVEY L. SANDERSON.